United States Patent [19]
Lattner et al.

[11] Patent Number: 6,067,856
[45] Date of Patent: May 30, 2000

[54] LIQUID LEVEL GAUGE AND IMPROVED FLOAT CONSTRUCTION THEREFOR

[75] Inventors: Michael D. Lattner; Adam J. Koehler, both of Dubuque, Iowa

[73] Assignee: Morrison Bros. Company, Dubuque, Iowa

[21] Appl. No.: 09/315,672

[22] Filed: May 20, 1999

[51] Int. Cl.[7] .............................. G01F 23/36; G01F 23/52; G01F 23/60

[52] U.S. Cl. .............................................. 73/313

[58] Field of Search ............................. 73/305, 306, 307, 73/308, 309, 310, 311, 312, 313, 314, 315, 316, 317, 318, 319, 320, 321, 322, 322.5; 340/618, 623; 116/120; 137/398

[56] References Cited

U.S. PATENT DOCUMENTS

| | | | |
|---|---|---|---|
| 3,482,447 | 12/1969 | Bennett | 73/321 |
| 3,558,861 | 1/1971 | Collins | 73/313 |
| 4,191,050 | 3/1980 | Kask | 73/322.5 |
| 5,144,836 | 9/1992 | Webb | 73/319 |
| 5,610,591 | 3/1997 | Gallagher | 340/618 |
| 5,649,450 | 7/1997 | Glab et al. | 73/307 |

*Primary Examiner*—William Oen
*Attorney, Agent, or Firm*—Tilton Fallon Lungmus

[57] ABSTRACT

A float for a liquid level gauge mechanism is disclosed, along with the mechanism with which such float is used. The float takes the form of an elongated hollow body of approximately the same weight or lighter than the weight of an equal volume of the liquid involved. The elongated body has first and second ends with the first end being heavier than the second and being the end to which the filament of a spring-operated reel is connected. In a preferred embodiment, the difference in weight between the first and second ends approximates the retraction force exerted upon the filament by the spring-operated reel.

14 Claims, 1 Drawing Sheet

LIQUID LEVEL GAUGE AND IMPROVED FLOAT CONSTRUCTION THEREFOR

BACKGROUND AND SUMMARY

Bennett patent U.S. Pat. No. 3,482,447 and Webb patent U.S. Pat. No. 5,144,836 disclose liquid level sensing gauges for use with storage tanks for liquid fuels and the like. The gauge mechanisms include, in each case, a gauge housing designed to be mounted at the top of a storage tank, ordinarily at or adjacent the filler opening for such a tank. Within the housing is a spring-biased reel upon which a filament is wound. The end of the filament extends into the tank through the opening and is connected by a suitable clip to a float member which floats on the surface of the liquid. Indicator means mounted on the housing or associated therewith is calibrated to reveal the liquid level in the tank by reason of the extent to which the filament has been unwound from the reel. In both patents, the floats are too large to pass upwardly through the tank openings into the housings of the gauge mechanisms, and in the Webb patent the clip at the end of the filament is large enough, and the opening of the gauge housing is small enough, so that the clip acts as a stop element to prevent the filament from retracting completely into the housing even when the float is unattached.

The floats shown in the two patents have the shape of flat discs or drums and the clips at the ends of the filaments are joined to the floats at their centers. Other float configurations are known, such as one of generally dumbbell configuration with hollow spheres at opposite ends joined by a connecting bar, with the filament being joined to the connecting bar at a point midway between the hollow spheres. Such a dumbbell float design is disclosed in Glab-Lattner patent U.S. Pat. No. 5,649,450, the disclosure of which is incorporated herein by reference, along with those of aforementioned U.S. Pat. Nos. 3,482,447 and 5,144,836.

A problem with prior float designs arises in connection with the filling of tanks through their filler openings and the vortex that is often created by the inwardly rushing fuel. Under such circumstances, a float, whether it be of the dumbbell shape and or flattened cylindrical shape, tends to become caught in the vortex and fails to remain at the surface of the liquid, with the result that the indicator means may not reflect the true level of liquid within the tank, at least until such time as inflow has ceased.

One aspect of this invention therefore lies in the discovery that such problems may be eliminated or greatly reduced if a float is constructed in the form of a hollow elongated body, particularly an elongated generally cylindrical body, that has a weight which, when combined with the lifting force everted by the spring-biased reel, is just sufficient to cause the body to float. One end of the body is lighter than the other end, and the filament is connected only to the heavier end. Ideally, the heavier end is tapered or rounded to provide a drag-reducing deflective end surface. The filament may be connected centrally to the apex of that surface or to the periphery of that surface at a point or points set back from the apex.

In a preferred embodiment of the invention, the greater weight at one end of the float results from a deflecting weight member permanently secured to one end of a hollow, sealed cylindrical body. The weight member has a tapered or rounded drag-reducing outer surface. The filament may be secured to a central point at the apex of that surface or at one or more points set back from the apex along the outer periphery of such surface.

The weight differential between the heavier and lighter ends of the float should approximate the pulling force exerted by the spring of the gauge mechanism. By so counter-balancing the retraction force of the spring, the effective buoyancy of the float at its opposite ends is balanced, so that the float in its normal state (without turbulence in the tank) extends horizontally along the surface of the liquid.

In the turbulence created during a filling operation, a float embodying this invention tends to remain at the surface, rocking and bobbing in different directions from its normal horizontal position but resisting forces tending to draw it downwardly into the vortex of the inrushing fluid, with the result that the indicator of the liquid level gauge will be operative to indicate liquid level even while a filling operation is underway.

DRAWINGS

DETAILED DESCRIPTION OF THE PREFERRED EMBODIMENTS

Figure 1:
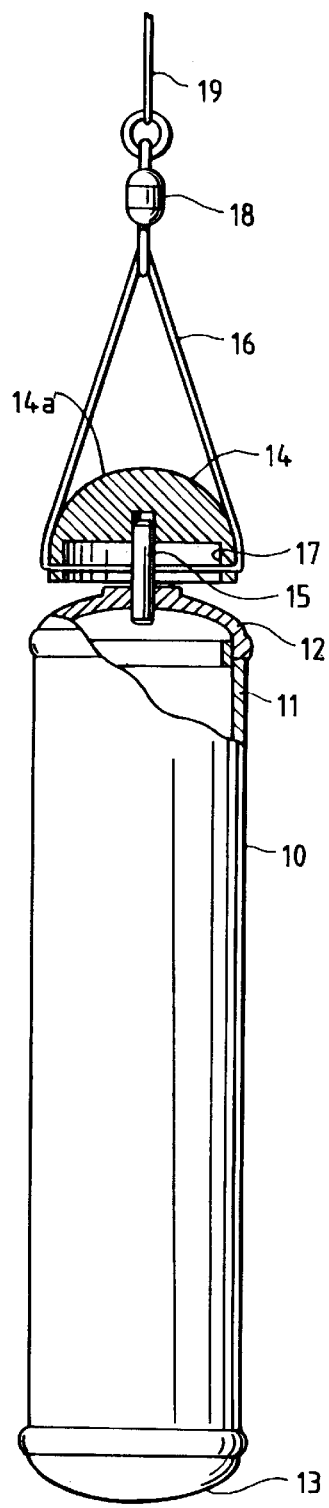
FIG. 1 is a side elevational view, taken partly in section, of a float embodying this invention.
Figure 2:
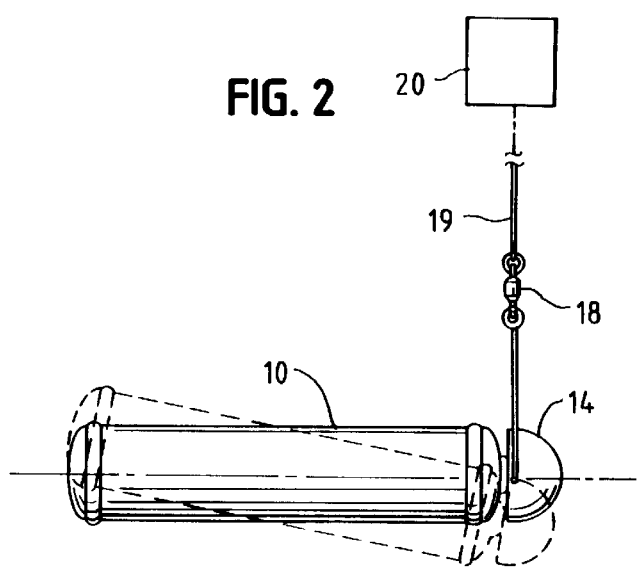
FIG. 2 is an elevational view showing the orientation of the float during normal use of the tank.

Referring to FIGS. 1 and 2, the numeral 10 generally designates a float in the form of an elongated hollow body of generally cylindrical shape having a cylindrical side wall 11 and opposite end walls 12 and 13. A flow-deflecting weight element 14 is permanently affixed to one end 12 of the hollow body by means of connector 15. Manufacturing economy favors the arrangement shown, with weight element 14 being affixed to one end of a hollow cylindrical body but, if desired, element 14 may be integrated with end wall 12 and thereby constitute the end wall of the hollow body.

The outer surface 14a of element 14 should be tapered or rounded as shown to reduce drag and facilitate proper orientation of the entire float during a filling operation. Attachment means in the form of a cable sling 16 extends through diametrically-disposed openings 17 along the periphery of element 14 well below the apex or upper end thereof. The cable is in turn connected to a swivel 18 which is joined to one end of a filament 19 carried by the spring-biased reel of gauge mechanism 20. Such mechanism is essentially the same as that disclosed in aforementioned U.S. Pat. Nos. 3,482,447, 5,144,836 and 5,649,450.

The float should be of a weight which, when combined with the lifting force exerted by the filament-rewind spring, causes it to barely float on the surface of the liquid within the tank. The float's weight may be approximately the same, as and is preferably slightly less, than, that of an equal volume of liquid with which it is used. Because one end of the float is heavier than the other end by reason of weight element 14, the float, if placed in liquid and left unconnected to filament 19 and mechanism 20, would tend to assume a position similar to that shown in broken lines in FIG. 2. However, the weight differential between opposite ends of the float closely approximates the spring force urging filament 19 into retracted condition, with the result that in normal operation with the float connected to the filament of the gauge mechanism, the float assumes a horizontal position as shown in solid lines in FIG. 2.

Filament 19 extends downwardly from gauge mechanism 20 through an opening at the top of a tank (not shown) containing the fuel or other liquid to be measured. During a filling operation, liquid is introduced into the tank through another opening that is often located at the tank's upper end but may also be found in a side wall or bottom wall of such a tank. In any case, during a filling operation, the float 10 is carried in generally horizontal condition on the surface of the liquid, but the turbulence that occurs during such an operation frequently generates a vortex sufficient to cause prior floats to be pulled downwardly below the turbulent surface and give misleading and fluctuating indications of liquid level on the gauges. Because of the elongated construction, its normally horizontal orientation on a liquid surface, and other factors such as the drag-reducing surface of weight element 14, which functions as a deflecting shield, the points of connection between the sling-like connector and element 14, and the greater weight distribution at the end of the float joined to connector 16, the float resists being submerged into the liquid despite the turbulence of that liquid.

The diameter of float, including its weight element 14, is less than the inside diameter of the bunghole that functions as the filler opening of the tank, although it may be larger than the opening of the neck of the gauge mechanism secured to the tank. If removal of the float from the tank is required, the neck is simply unscrewed from bunghole to permit extraction of the float in vertical condition from the tank.

Figure 3:
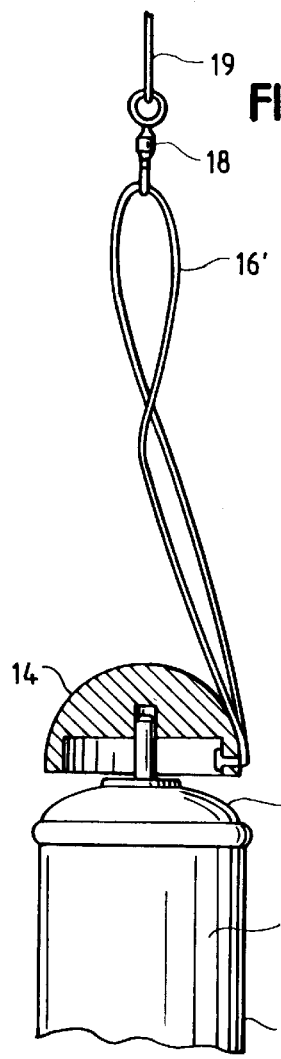
FIG. 3 is a side elevational view, shown partly in section, of a second embodiment of the invention.

FIG. 3 illustrates a second embodiment which is similar to the embodiment of FIGS. 1 and 2 except that the connecting means joining the float to filament 19 is in the form of a flexible cable 16' joined at a single point along the peripheral edge of weight element 14. It is believed that more of a wobbling action may occur during a filling operation, but in all other respects the action is the same, including the horizontal disposition of the float during conditions of normal use.

Figure 4:
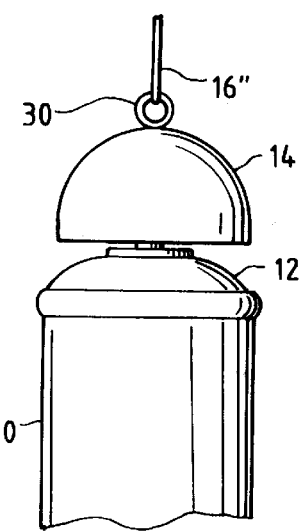
FIG. 4 is an elevational view illustrating a third embodiment of this invention.

FIG. 4 depicts a third embodiment which is similar to the embodiments of FIGS. 1–3 except that flexible cable 16' is centrally connected to weight element 14 at the extreme end or apex of that element. A suitable connector in the form of attachment ring 30 is provided at the apex of weight element 14. As in the other embodiments, cable 16" of the third embodiment may be joined at its upper end to a suitable swivel (not shown in FIG. 4) which may be of the same form as swivels 18 of the preceding embodiments.

In all forms of the invention, the floats are elongated and preferably of cylindrical shape. Such floats are heavier at one end than the other and are adapted to be joined at their heavier ends to the distal ends of the filaments carried by the spring-biased reels of the gauge mechanisms. In all embodiments, the floats are of a weight which, when combined with the lifting force exerted by the filament-rewind springs, causes them to float on the surface of the liquid within the tank in generally horizontal condition as depicted in FIG. 2.

What is claimed is:

1. A float for use with a liquid level gauge mechanism for a liquid storage tank having a filler opening, said gauge mechanism including a spring-operated reel on which is wound a filament connected at its end to said float; said spring-operated reel exerting a retraction force on said filament; said gauge mechanism having or being associated with indicator means for indicating the amount of liquid in said tank by reason of the length of unwound filament between said reel and float; wherein the improvement comprises said float being in the form of a hollow elongated body which, when vertically oriented, has opposite upper and lower ends; said float being approximately the same weight or lighter than the weight of an equal volume of said liquid and being connected to said filament only at or adjacent to said upper end; said upper end of said float being heavier than said lower end with the difference in weight between said upper and lower ends of said float approximating the retraction force exerted by said spring on said filament.

2. The float of claim 1 in which said body is generally cylindrical.

3. The float of claim 1 in which said body includes a weight element at the upper end thereof.

4. The float of claim 3 in which said weight element has a tapered or rounded outer surface.

5. The float of claim 4 in which connecting means is joined to at least one peripheral edge portion of said weight element; said connecting means also being affixed to the end of said filament.

6. The float of claim 5 in which said connecting means is joined to diametrically opposite peripheral portions of said weight element.

7. The float of claim 4 in which said outer surface of said weight element has an apex and connecting means is joined to said float only at said apex; said connecting means also being affixed to the end of said filament.

8. In combination, a liquid level gauge mechanism for a liquid storage tank having a filler opening and a float for use therewith; said gauge mechanism including a spring-operated reel on which is wound a filament connected at its end to said float; said spring-operated reel exerting a retraction force on said filament; said gauge mechanism having or being associated with indicator means for indicating the amount of liquid in said tank by reason of the length of unwound filament between said reel and float; said float being in the form of a hollow elongated body having first and second ends; said first end being heavier than said second end and said filament being connected to said body at or adjacent to said first end; said float being of approximately the same weight or lighter than the weight of an equal volume of said liquid with the difference in weight between said first and second ends of said float approximating the retraction force exerted by said spring on said filament.

9. The combination of claim 8 in which said body is generally cylindrical.

10. The combination of claim 8 in which said body includes a weight element at the upper end thereof.

11. The combination of claim 10 in which said weight element has a tapered or rounded outer surface.

12. The combination of claim 11 in which connecting means is joined to at least one peripheral edge portion of said weight element; said connecting means also being affixed to the end of said filament.

13. The combination of claim 12 in which said connecting means is joined to diametrically opposite peripheral portions of said weight element.

14. The combination of claim 11 in which said outer surface of said weight element has an apex and connecting means is joined to said float only at said apex; said connecting means also being affixed to the end of said filament.

* * * * *